(12) United States Patent
Krohn et al.

(10) Patent No.: US 8,607,826 B2
(45) Date of Patent: Dec. 17, 2013

(54) INTERLOCKING BEND LIMITER AND METHOD OF ASSEMBLY

(75) Inventors: Dan Krohn, Houston, TX (US); Nghia K. Vuong, Katy, TX (US)

(73) Assignee: Oceaneering International, Inc., Houston, TX (US)

( * ) Notice: Subject to any disclaimer, the term of this patent is extended or adjusted under 35 U.S.C. 154(b) by 81 days.

(21) Appl. No.: 13/436,377

(22) Filed: Mar. 30, 2012

(65) Prior Publication Data
US 2013/0255818 A1 Oct. 3, 2013

(51) Int. Cl.
*F16L 11/00* (2006.01)

(52) U.S. Cl.
USPC ........... 138/110; 138/155; 138/157; 138/161; 29/428; 285/419; 285/146.1; 285/261

(58) Field of Classification Search
USPC ................. 138/110, 120, 151, 156, 161, 155; 285/419, 261, 146.1; 29/428
See application file for complete search history.

(56) References Cited

U.S. PATENT DOCUMENTS

| | | | | |
|---|---|---|---|---|
| 4,739,801 A | * | 4/1988 | Kimura et al. | 138/120 |
| 5,046,764 A | * | 9/1991 | Kimura et al. | 285/154.2 |
| 5,069,486 A | * | 12/1991 | Kimura et al. | 285/154.2 |
| 5,197,767 A | * | 3/1993 | Kimura et al. | 285/39 |
| 5,215,338 A | * | 6/1993 | Kimura et al. | 285/154.2 |
| 6,668,865 B2 | * | 12/2003 | Miyamoto et al. | 138/108 |
| 6,682,103 B1 | * | 1/2004 | Poirier | 285/146.1 |
| 7,100,641 B2 | * | 9/2006 | Tyrer et al. | 138/110 |
| 2004/0050441 A1 | * | 3/2004 | Roschi | 138/120 |

* cited by examiner

*Primary Examiner* — Patrick F Brinson
(74) *Attorney, Agent, or Firm* — Gary R. Maze; Berenbaum Weinshienk, PC

(57) ABSTRACT

Interlocking bend limiter sections are substantially mirror images of each other and are joined to form an interlocking bend limiter segment without use of fasteners by engaging engaging each other's interlocking ends. An interlocking bend limiter comprises a plurality of interlocking bend limiter segment secured at an end by an end piece.

13 Claims, 2 Drawing Sheets

INTERLOCKING BEND LIMITER AND METHOD OF ASSEMBLY

FIELD OF THE INVENTION

The invention relates to a segmented bend limiter and its methods of use. More specifically, the invention relates to a segmented bend limiter that comprises a plurality of segments, each comprising cooperatively joinable halves, where the segment halves are dimensioned and configured to be joined without using additional fasteners, the terminal segment in a chain of segments being secured and fastened by an end fastener.

BACKGROUND

A bend limiter is a device used to restrict bending of the flexible pipe. As the term is used in the art, a bend limiter includes a bend restrictor, bend stiffener, and/or bellmouth. Bend limiters are used to prevent possible the overbending of flexible flowlines, umbilicals and cables during installation and service. Typically, a bend limiter will lock or otherwise impede movement about two or more axes when a minimum bend radius is reached.

Bend limiters may be used onshore, offshore, and/or subsea and typically comprise a series of interlocking vertebrae joined to form a bend limiter having a desired length.

FIGURES

The figures supplied herein disclose various embodiments of the claimed invention.

Figure 1:
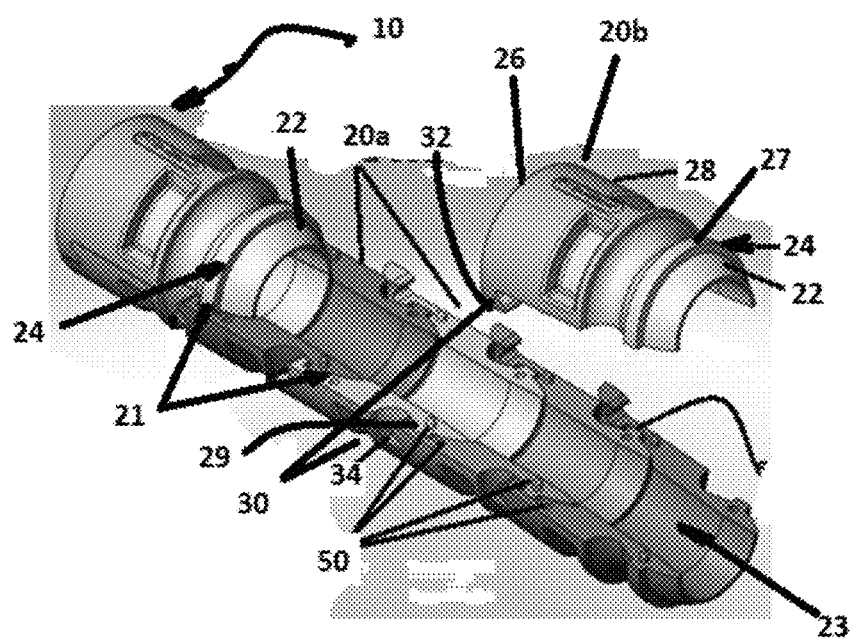
Figure 2:
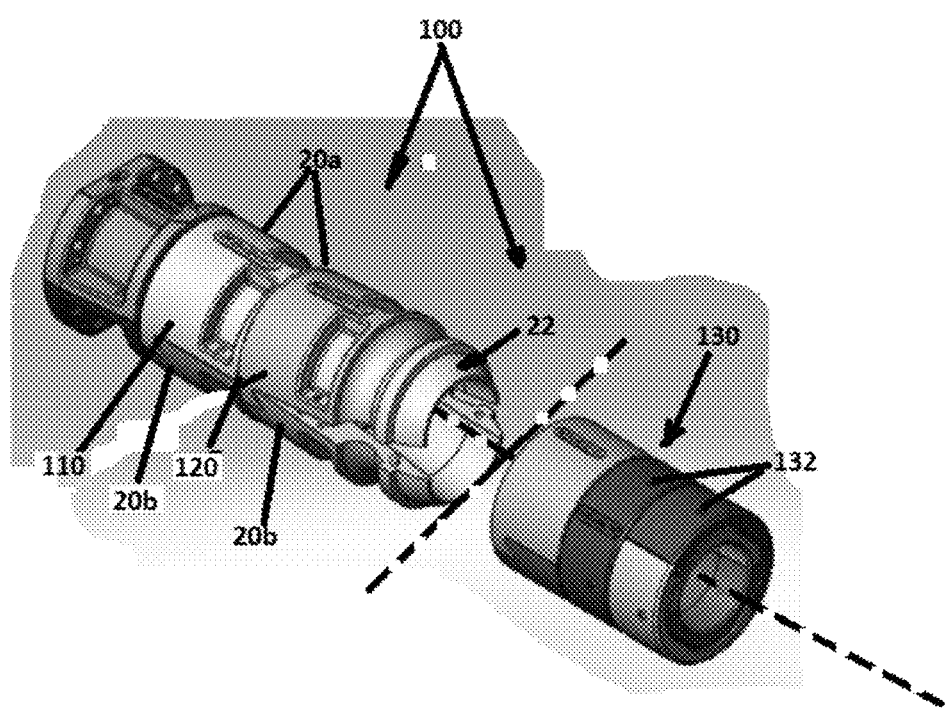

FIG. 1 is a cutaway planar view in partial perspective of an exemplary semi-tubular sections of an interlocking bend limiter; and FIG. 2 is a further cutaway planar view in partial perspective of an exemplary semi-tubular sections of an interlocking bend limiter showing an end cap piece.

DESCRIPTION OF EMBODIMENTS

Referring now to FIGS. 1 and 2, interlocking bend limiter segment 10 comprises first semi-tubular section 20a and second semi-tubular section 20b. Second semi-tubular section 20b is substantially identical to first semi-tubular section 20a. First semi-tubular and second semi-tubular sections 20a, 20b are dimensioned and configured to be joined cooperatively at their respective interlocks, the first semi-tubular section interlock tab receiver dimensioned and adapted to receive the corresponding interlock tab of the second semi-tubular section, the portions of the conduits of the cooperatively joined first semi-tubular and second semi-tubular sections providing an enclosed fluid pathway therethrough. One or both of first semi-tubular and second semi-tubular sections 20a,20b may comprise a plastic suitable for use, e.g., subsea.

Each of first semi-tubular section 20a and second semi-tubular section 20b comprises substantially spherical first end 22, substantially semi-circular second end 26, and substantially semi-tubular middle section 28. First and second semi-tubular sections 20a, 20b are dimensioned and configured to be joined without using additional fasteners.

Substantially spherical first end 22 further comprises engaging section 24 disposed about an outer surface of substantially spherical first end 22, its interior forming a portion of conduit 23 therethrough.

Substantially semi-circular second end 26 further comprises engaging section receiver 21 and interlock 30.

Engaging section receiver 21 is dimensioned and adapted to engage engaging section 24 of substantially spherical first end 22. The interior of engaging section receiver 21 defines a portion of a conduit therethrough. In embodiments, engaging section 24 is disposed about an outer surface of substantially spherical first end 24 and comprises ridge 27. In these embodiments, engaging section receiver 21 of first semi-tubular section 20a comprises channel 29 dimensioned and adapted to receive ridge 27 second semi-tubular section 20b, and vice-à-versa.

Interlock 30 comprises interlock tab 32 and corresponding interlock tab receiver 34.

Substantially semi-tubular middle section 28 is disposed intermediate substantially spherical first end 22 and substantially semi-circular second end 26. The interior of substantially semi-tubular middle section 28 defines a portion of conduit 23 therethrough.

In certain embodiments, each of first and second semi-tubular sections 20a, 20b further comprises a plurality of alignment guides 50. These are typically disposed integral with a portion of substantially tubular middle section 28, where at least one of alignment guides 50 of first semi-tubular section 20a is dimensioned and configured to cooperatively receive another of alignment guides 50 of second semi-tubular section 20b. In typical configurations, alignment guides 50 comprise a post and a corresponding alignment guide receiver is dimensioned and configured to receive the post.

In certain embodiments, one or both of first semi-tubular and second semi-tubular sections 20a,20b further comprises an armored portion.

As can be seen in FIG. 1, when cooperative joined the interiors of first semi-tubular and second semi-tubular sections 20a,20b define conduit 23 therethrough.

Referring now to FIG. 2, using first semi-tubular and second semi-tubular sections 20a,20b, interlocking bend limiter 100 may be constructed and comprise one or more segments 110, where substantially spherical first ends 22 of interlocked first semi-tubular and second semi-tubular sections 20a,20b of a first segment 110 are cooperatively received into substantially semi-circular second ends 26 (FIG. 1) of a second segment 120, thereby locking the first and second semi-tubular sections 20a, 20b of first segment 110 together. Interlocking bend limiter 100 is terminated using end piece 130 which is coupled to substantially spherical first ends 22 of second segment 120. End piece 130 is dimensioned and adapted to lock together first and second semi-tubular sections 20a, 20b of second segment 120 together at an exposed end of the second segment. In some configurations, end piece 120 comprises a lock dimensioned and adapted to lock together second interlocking bend limiter section 120, e.g. one or more fasteners 132 such as bolts, clamps, bands, or the like, or a combination thereof.

When joined and terminated, the joined first and second segments 110, 120 are dimensioned and adapted to provide a predetermined amount of movement about at least two axes, e.g. an X and Y set of axes where one axis is positioned within the conduit defined by the interiors of first semi-tubular and second semi-tubular sections 20a,20b.

In most configurations, assembly of the first and second segments 110, 120 requires no bolts.

In the operation of currently preferred embodiments, referring to FIGS. 1 and 2, interlocking bend limiter may be assembled by assembling first interlocking bend limiter segment 110, formed by joining first semi-tubular section 20a to substantially identical second semi-tubular section 20b. As described above, first semi-tubular and second semi-tubular sections 20a,20b each comprise substantially spherical first end 22, interlocking second end 26, and substantially semi-tubular section 28 disposed intermediate substantially spherical first end 22 and interlocking second end 26. When joined, interlocking second end 26 of first semi-tubular section 20a is cooperatively paired with interlocking second end 26 of second semi-tubular section 20b.

Second interlocking bend limiter section 120 is assembled similarly, but second interlocking bend limiter section 120 is assembled about substantially spherical first end 22 of first interlocking bend limiter section 110 by positioning engaging section receiver 21 of second interlocking bend limiter section 120 about engaging section 24 of substantially spherical first end 22 of first interlocking bend limiter section 110 and engaging interlocking second end 26 of first semi-tubular section 110 with interlocking second end 26 of second semi-tubular section 20b. As noted above, second interlocking bend limiter section 120 is substantially identical to first interlocking bend limiter section 110.

When two or more interlocking bend limiter sections, e.g. 110 and 120, have been assembled, end piece 130 is secured about substantially spherical first end 22 of the final interlocking bend limiter section in the chain, e.g. second interlocking bend limiter section 120, such as by use of one or more fasteners 132.

The foregoing disclosure and description of the inventions are illustrative and explanatory. Various changes in the size, shape, and materials, as well as in the details of the illustrative construction and/or an illustrative method may be made without departing from the spirit of the invention.

What is claimed is:

1. An interlocking bend limiter segment, comprising:
   a. a first semi-tubular section, the first semi-tubular section further comprising:
      i. a substantially spherical first end, the substantially spherical first end further comprising:
         1. an engaging section disposed about an outer surface of the substantially spherical first end; and
         2. a portion of a conduit therethrough;
      ii. a substantially semi-circular second end, the substantially semi-circular second end further comprising:
         1. an engaging section receiver dimensioned and adapted to engage the engaging section of the substantially spherical first end, the engaging section receiver defining a further portion of the conduit therethrough;
         2. an interlock, comprising:
            a. an interlock tab; and
            b. a corresponding interlock tab receiver; and
      iii. a substantially semi-tubular middle section disposed intermediate the substantially spherical first end and the substantially semi-circular second end, the substantially semi-tubular middle section defining a further portion of the conduit therethrough; and
   b. a second semi-tubular section, substantially identical to the first semi-tubular section, the first semi-tubular and second semi-tubular sections dimensioned and configured to be joined cooperatively at their respective interlocks, the first semi-tubular section interlock tab receiver dimensioned and adapted to receive the corresponding interlock tab of the second semi-tubular section, the portions of the conduits of the cooperatively joined first semi-tubular and second semi-tubular sections providing an enclosed fluid pathway therethrough.

2. The interlocking bend limiter segment of claim 1, wherein:
   a. the engaging section disposed about the outer surface of the substantially spherical first end of the first semi-tubular section comprises a ridge; and
   b. the engaging section receiver of the second semi-tubular section comprises a channel dimensioned and adapted to receive the ridge.

3. The interlocking bend limiter segment of claim 1, wherein the first and second semi-tubular sections are dimensioned and configured to be joined by their engaging sections without using additional fasteners.

4. The interlocking bend limiter segment of claim 1, wherein each of the first and second semi-tubular sections further comprises a plurality of alignment guides integral with a separate portion of each respective substantially tubular middle section, one of the alignment guides of the first semi-tubular section being dimensioned and configured to cooperatively receive one of the alignment guides of the second semi-tubular section.

5. The interlocking bend limiter segment of claim 4, wherein one of the alignment guides comprises a post and a corresponding alignment guide receiver is dimensioned and configured to receive the post.

6. The interlocking bend limiter segment of claim 1, wherein at least one of the first semi-tubular and second semi-tubular sections comprises a plastic.

7. The interlocking bend limiter segment of claim 1, wherein at least one of the first semi-tubular and second semi-tubular sections comprises an armored portion.

8. An interlocking bend limiter, comprising:
   a. a first segment, comprising:
      i. a first semi-tubular section, the first semi-tubular section further comprising:
         1. a substantially spherical first end, the substantially spherical first end further comprising:
            a. an engaging section disposed about an outer surface of the substantially spherical first end; and
            b. a partial portion of a conduit therethrough;
         2. a substantially semi-circular second end, the substantially semi-circular second end further comprising:
            a. an engaging section receiver dimensioned and adapted to engage the engaging section of the substantially spherical first end, the engaging section receiver defining a further partial portion of the conduit therethrough;
            b. an interlock, comprising:
               i. a interlock tab; and
               ii. a corresponding interlock tab receiver; and
         3. a substantially semi-tubular middle section disposed intermediate the substantially spherical first end and the substantially semi-circular second end, the substantially semi-tubular middle section defining a further partial portion of the conduit therethrough; and
      ii. a second semi-tubular section, substantially identical to the first semi-tubular section, the first semi-tubular and second semi-tubular sections dimensioned and configured to be joined cooperatively at their respective interlocks, the first semi-tubular section interlock tab receiver dimensioned and adapted to receive a corresponding interlock tab of the second semi-tubular section, the partial conduits of the cooperatively joined first semi-tubular and second semi-tubular sections defining an interior fluid pathway therethrough;
   b. a second segment, identical to the first segment, the first substantially spherical first end of the first segment cooperatively received into the substantially semi-circular second end of the second segment, thereby locking the first and second semi-tubular sections of the first segment together; and c. an end piece coupled to the substantially spherical first ends of the second segment at an interlocked exposed end of the second segment, the end piece dimensioned and adapted to lock together the first and second semi-tubular sections of the second segment together.

9. The interlocking bend limiter of claim 8, wherein assembly of the first and second segments requires no bolts.

10. The interlocking bend limiter of claim 8, wherein the joined first and second segments are dimensioned and adapted to provide a predetermined amount of movement about at least two axes.

11. A method of providing an interlocking bend limiter, comprising:

a. assembling a first interlocking bend limiter segment by joining a first semi-tubular section to a second semi-tubular section, the first semi-tubular and second semi-tubular sections substantially identical to each other, each semi-tubular section comprising a substantially spherical first end, an interlocking second end and a substantially semi-tubular middle section intermediate the substantially spherical first end and the interlocking second end, the assembling comprising engaging the first semi-tubular section's interlocking second end with the second semi-tubular section's interlocking second end;

b. assembling a second interlocking bend limiter section about the substantially spherical first end of the first interlocking bend limiter section, the second interlocking bend limiter section substantially identical to the first interlocking bend limiter section, the assembling of the second interlocking bend limiter section comprising:

i. positioning an engaging section receiver of the second interlocking bend limiter section about an engaging section of the substantially spherical first end of the first interlocking bend limiter section; and ii. engaging the first semi-tubular section's interlocking second end with the second semi-tubular section's interlocking second end; and c. securing an end piece about the substantially spherical first end of the second interlocking bend limiter section, the end piece comprising a lock dimensioned and adapted to lock together the second interlocking bend limiter section.

12. The method of providing an interlocking bend limiter of claim 11, wherein the end piece is secured about the substantially spherical first end of the second interlocking bend limiter section using a fastener.

13. The method of providing an interlocking bend limiter of claim 12, wherein the fastener comprises at least one of (i) a bolt or (ii) a clamp.

* * * * *